United States Patent
Sauder et al.

(10) Patent No.: US 7,549,383 B2
(45) Date of Patent: Jun. 23, 2009

(54) PLANTER METER SUSPENSION SYSTEM AND METHOD OF IMPROVING SEED SPACING

(75) Inventors: Gregg A. Sauder, Tremont, IL (US); Derek A. Sauder, Tremont, IL (US); Don L. Dunlap, Pekin, IL (US); Chad E. Plattner, Tremont, IL (US); Justin Koch, Deer Creek, IL (US)

(73) Assignee: Precision Planting, Inc., Tremont, IL (US)

( * ) Notice: Subject to any disclaimer, the term of this patent is extended or adjusted under 35 U.S.C. 154(b) by 257 days.

(21) Appl. No.: 11/306,684

(22) Filed: Jan. 6, 2006

(65) Prior Publication Data

US 2006/0213407 A1 Sep. 28, 2006

Related U.S. Application Data

(60) Provisional application No. 60/642,308, filed on Jan. 7, 2005.

(51) Int. Cl.
*A01B 49/04* (2006.01)
*A01C 5/00* (2006.01)
*A01C 7/00* (2006.01)
*A01C 7/18* (2006.01)
*A01C 9/00* (2006.01)

(52) U.S. Cl. .................. 111/137; 111/69; 111/187; 111/188; 111/200; 111/927

(58) Field of Classification Search .................. 111/200, 111/59–81, 170–188, 925–927, 134–137
See application file for complete search history.

(56) References Cited

U.S. PATENT DOCUMENTS

| | | | |
|---|---|---|---|
| 3,552,601 | A | 1/1971 | Cordova et al. |
| 3,990,606 | A | 11/1976 | Gugenhan |
| 4,009,668 | A | 3/1977 | Brass et al. |
| 4,430,952 | A | 2/1984 | Murray |
| 4,450,979 | A | 5/1984 | Deckler |
| 4,594,951 | A | 6/1986 | Grataloup |
| 4,766,962 | A | 8/1988 | Frase |
| 5,170,909 | A | 12/1992 | Lundie et al. |
| 5,235,922 | A | 8/1993 | Deckler |
| 5,544,709 | A | 8/1996 | Lowe et al. |
| 5,720,233 | A | 2/1998 | Lodico et al. |
| 5,992,338 | A | 11/1999 | Romans |
| 6,389,999 | B1 | 5/2002 | Duello |
| 6,701,857 | B1 | 3/2004 | Jensen et al. |

*Primary Examiner*—Christopher J. Novosad
(74) *Attorney, Agent, or Firm*—Larkin Hoffman Daly & Lindgren Ltd.; Thomas J. Oppold

(57) ABSTRACT

A system and method to reduce vertical acceleration experienced by a seed meter of a planter row unit during planting operations, the planter row unit having a row unit frame including a hopper support from which the seed meter is operably supported. The system includes a support system operably vertically supporting the hopper support vertically movably independent of the row unit frame.

17 Claims, 4 Drawing Sheets

PLANTER METER SUSPENSION SYSTEM AND METHOD OF IMPROVING SEED SPACING

BACKGROUND OF THE INVENTION

1. Field of the Invention

The present invention is directed generally toward agricultural planters and more particularly to a suspension system for such planters.

2. Description of the Related Art

It is well recognized that proper and uniform spacing of seed in the furrow is essential to maximizing crop yield. Recent advances in metering technology have resulted in seed meters capable of singulating seed extremely well on test stands prior to planting. While the advances in metering technology has resulted in improved seed singulation in the field, the same singulation performance achieved on a test stand, is generally not obtainable under field conditions, particularly when traveling at faster planting speeds. For example, although many meters are capable of singulating at 99% accuracy or greater on the test stand, when operating in the field, the same meter may only plant at 95% singulation accuracy. The loss in accuracy under field conditions is due to a number of factors, including changes in vertical motion and vertical acceleration of the planter from jostling, sudden jolts and bouncing of the planter as the planter encounters changes in field topography, ruts, ridges, rocks and other obstacles as the planter traverses the field.

For example, as the planter travels through the field, changes in levelness of the soil and roughness of the field may cause the entire planter and/or the individual row units to bounce and undergo vertical acceleration. With conventional planter row units, the metering system is rigidly mounted to the row unit frame, thereby causing the seed meter to experience the similar bouncing motions and vertical acceleration changes as the planter frame to which it is rigidly mounted.

Subjecting the seed meter to abrupt changes in vertical position or vertical acceleration can effect the uniformity of seed spacing in the furrow by causing variations in the seeds initial vertical velocity upon discharge from the seed meter. It should be appreciated that if seeds fall at different velocities through the seed tube, the spacing between adjacent seeds will be effected. For example, when the seed meter is traveling upward (relative to the global coordinate system) as a seed is being released from the seed selection mechanism, the seed's initial vertical velocity (with respect to ground) will be less than the initial velocity of a seed released when the meter is stationary or traveling downward. This difference in initial vertical velocity will result in a difference in the amount of time required for the seed to fall through the seed tube and into the furrow, which, accordingly, will result in deviations in seed spacing in the furrow. Additionally, sudden jolts or vertical acceleration of the seed meter may result in seeds being dislodged from the seed selection mechanism of the seed meter (i.e., a finger, cavity disk, vacuum disk, etc.) thereby resulting in seed skips, further contributing to seed spacing irregularities.

Planter improvements such as the walking beam gauge wheel depth control have helped to reduce row unit jostling and bounce as the planter traverses the field, however, there remains a need to further reduce the amount of vertical acceleration experienced by the seed meter and to minimize variations in initial vertical velocity between seeds upon discharge from the seed meter.

SUMMARY

The present invention is directed toward a system and method to reduce vertical acceleration experienced by a seed meter of a planter row unit during planting operations, the planter row unit having a row unit frame including a hopper support from which the seed meter is operably supported. The system includes a support system operably vertically supporting the hopper support vertically movably independent of the row unit frame.

DETAILED DESCRIPTION

Figure 1:
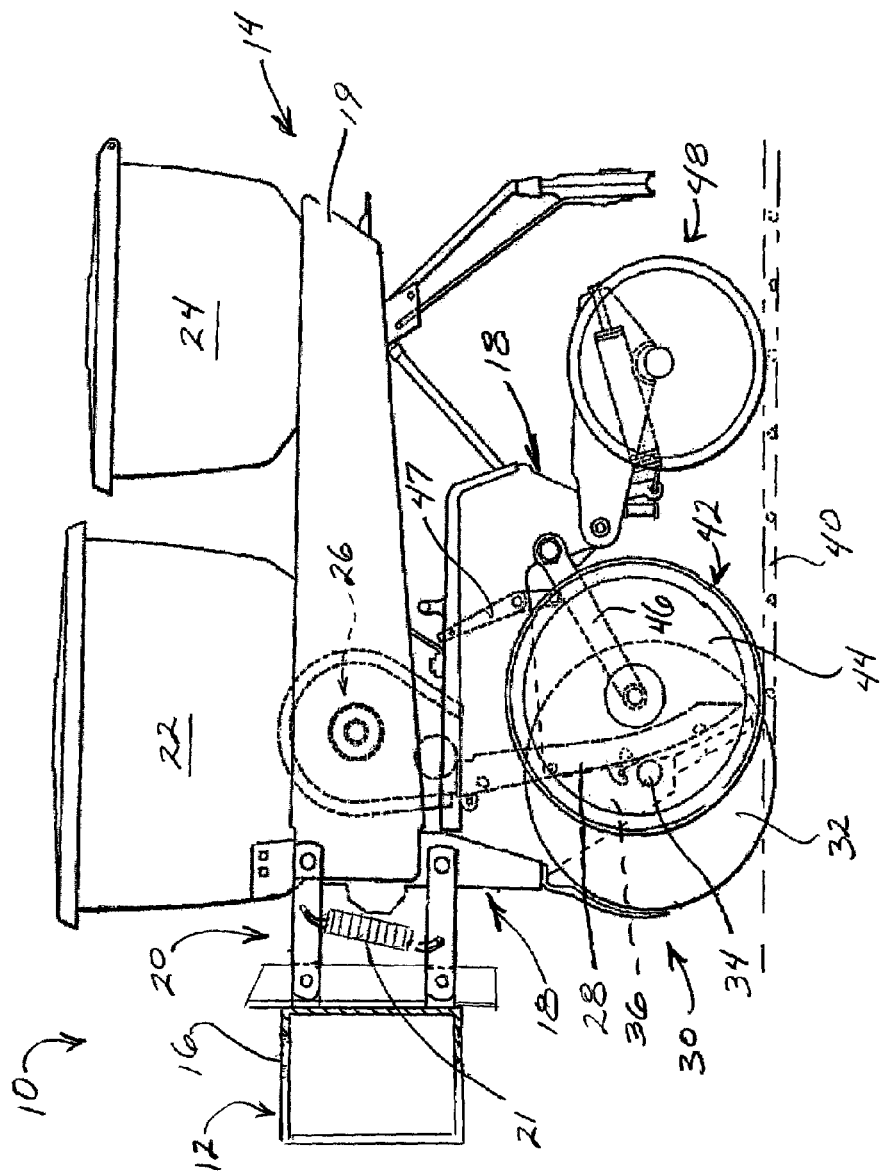
FIG. 1 is a side elevation view of a conventional planter.

Referring now to the drawings, wherein like reference numerals designate identical or corresponding parts throughout the several views, FIG. 1 illustrates a side elevation view of a conventional row-crop planter 10, such as disclosed in U.S. Pat. No. 4,009,668, which is incorporated herein, in its entirety, by reference.

The planter 10 includes a mobile main frame 12, only a portion of which is illustrated in FIG. 1. As is conventional, the main frame 12 is attached to and towed by a tractor (not shown). A number of individual row units 14 are spaced at intervals along the transverse tool bar 16 of the main frame 12. Each individual row unit 14 includes a row unit frame 18, which is vertically adjustable relative to the main frame 12 by a parallel linkage 20. Down pressure on the row unit is maintained by springs 21 disposed between the arms of the parallel linkage 20. Only one single row unit 14 is shown and described herein, and, as is conventional, each row unit 14 includes a seed hopper 22 and a chemical hopper 24 for herbicide and/or insecticide supported by the hopper support 19 which forms a part of the row unit frame 18. Each individual row unit 14 further includes a seed meter 26, which receives seed from the seed hopper 22 and which discharges individual seeds at regular intervals into the seed tube 28.

Each row unit 14 includes a furrow opening assembly 30. The furrow opening assembly 30, typically comprises a pair of generally vertical disposed disks 32 that rotate on generally horizontal transverse shafts 34 supported by downwardly extending brackets 36 from the row unit frame 18. The axis of the respective furrow opening disks 32 are slightly inclined relative to one another so that the disks 32 contact one another forwardly and below the disk axis. In operation, the lower portion of the furrow opening disks 32 are disposed below the surface of the soil so that the disks form a V-shaped furrow 40 as the planter 10 advances through the field. The seed tube 28 deposits the seed in the furrow 40 behind the axis of the furrow opening disks 32. A gauge wheel assembly 42 is mounted on the row unit frame 18 adjacent the furrow opening disks 32. The gauge wheel assembly 42 comprises a pair of gauge wheels 44 disposed adjacent the outer sides of the furrow opening disks 32. A gauge wheel arm 46 connects each gauge wheel 44 to the row unit frame 18. As is well known, an adjustable stop 47 operates between the row unit frame 18 and the gauge wheel arm 46 to limit the upward movement of the gauge wheel 44 relative to the row unit frame 18. Because the gauge wheels 44 ride on the surface of the ground when the planter 10 is in operation, the vertical position of the gauge wheels 44 relative to the furrow opening disks 32 controls the depth of the furrow 40 opened by the disks 32. A furrow closing assembly 48 disposed rearwardly of the furrow opening assembly 30, closes the furrow 40 by pushing the soil back into the furrow over the planted seeds. All the above is described in greater detail in U.S. Pat. No. 4,009,668, which, as previously stated, is incorporated herein by reference.

Although the furrow opening assembly 30 has been described as comprising a pair of generally vertical disks 32, it should be appreciated that some conventional planters utilize a furrow opening assembly 30 having only one furrow opening disk 32, while still other furrow opening assemblies utilize a shovel or the like. Thus, it should be understood that reference to the furrow opening assembly 30 throughout this specification is intended to include any type of furrow opening assembly, whether comprised of a pair of disks, a single disk, a shovel, or any combination thereof, or any other means which is or may be employed to create a furrow in the soil. Similarly, reference to the furrow closing assembly 48 throughout this specification is intended to include any apparatus which is or may be employed for replacing the soil over the planted seed in the furrow.

With this understanding of the basic structure of a conventional planter 10, it should be appreciated that as the planter 10 traverses the field any sudden change in the vertical position experienced by the row unit frame 18 will be transferred to the hopper support 19 and ultimately to the seed meter 26 operably supported thereby.

As previously described, with a conventional planter, sudden changes in the vertical position of the seed meter 26 will result in variation of the initial velocity between seeds being discharged from the seed meter 26, thereby resulting in non-uniform seed spacing in the seed furrow. Furthermore, sudden jolts or vertical acceleration of the seed meter may result in seeds prematurely falling from the seed selection mechanism of the seed meter, thereby resulting in seed skips, further contributing to seed spacing irregularities.

Accordingly, it should be understood that if the hopper support and the seed meter 26 operably supported thereby is isolated from the vertical motion and vertical acceleration experienced by the row unit frame 18, sudden vertical accelerations of the seed meter would be reduced, resulting in fewer seed skips and less variation in the initial vertical velocity among seeds being dispensed by the isolated seed meter 26, both of which contribute to irregular seed spacing in the furrow.

While FIG. 1 generally depicts a finger-pickup type seed meter, such as disclosed in U.S. Pat. No. 3,552,601 to Hansen, it should be understood that all other types of seed meters typically found on conventional planters are also either directly or operably mounted to or supported by the hopper support 19. Therefore all conventional seed meters will suffer from the same effects of sudden vertical acceleration and sudden vertical motion as described above if the hopper support operably supporting the seed meter is not isolated from the row unit frame. Thus, although the drawing figures may illustrate finger-pickup meters, the present invention is equally applicable to all other types of meters, including, but not limited to cavity-disk meters such as disclosed in U.S. Pat. No. 5,720,233 to Lodico et al., belt meters such as disclosed in U.S. Pat. No. 5,992,338 to Romans, vacuum-disk meters such as disclosed in U.S. Pat. No. 3,990,606 to Gugenhan and in U.S. Pat. No. 5,170,909 to Lundie et al. and positive-air meters such as disclosed in U.S. Pat. No. 4,450,979 to Deckler.

Figure 2:
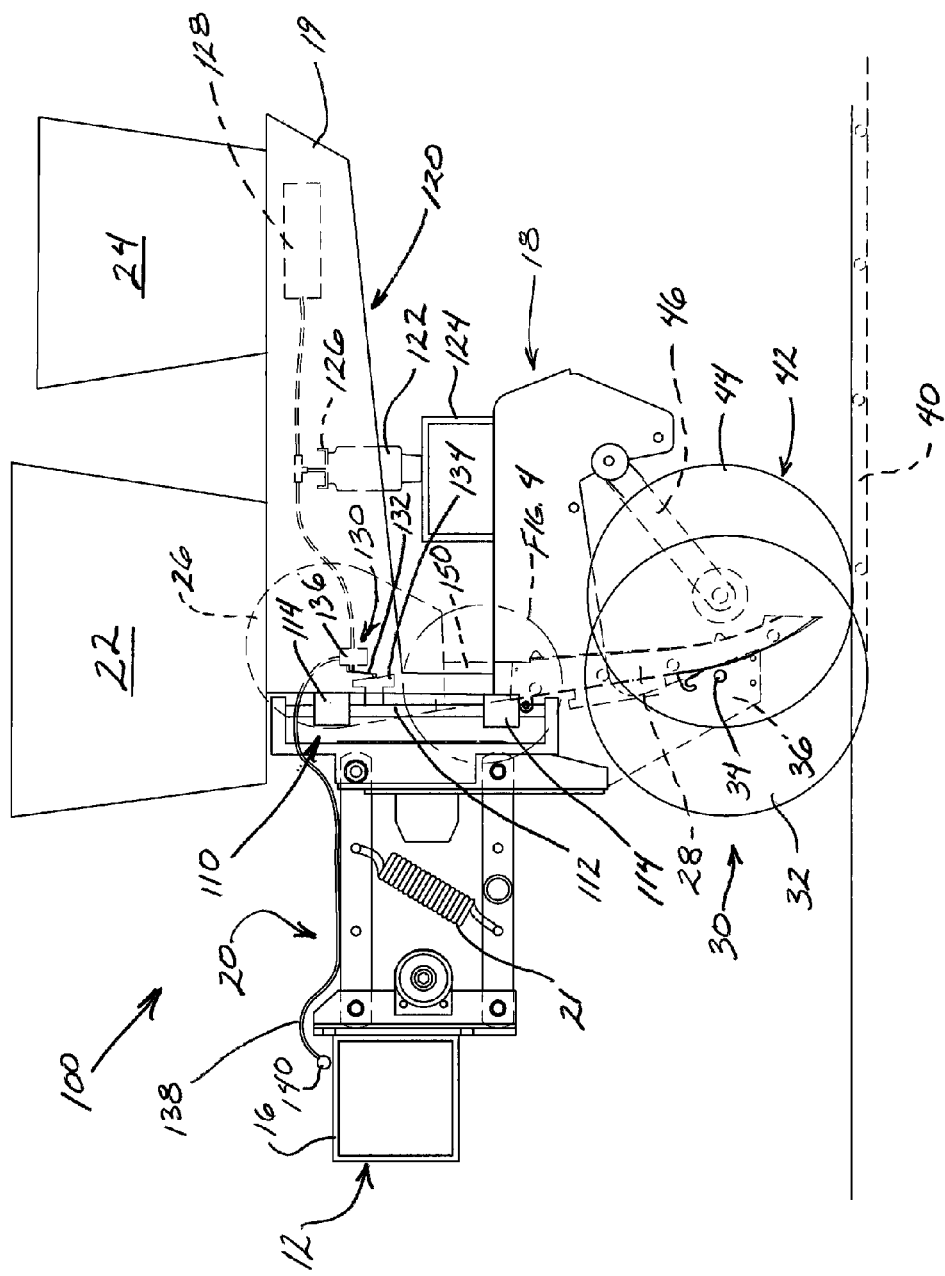
FIG. 2 is a side elevation view of a planter incorporating the suspension system of the present invention.

FIG. 2 illustrates one embodiment of the suspension system 100 of present invention which operably isolates the seed meter 26 from the vertical bouncing and vertical acceleration experienced by the rest of the row unit frame 18 as the planter traverses the field. In this embodiment, the hopper support 19 which supports the hoppers 22, 24 and the seed meter 26 is no longer rigidly fixed to the remainder of the row unit frame 18. Rather the hopper support 19 is mounted on a slide system 110 and spring system 120.

In the preferred embodiment of the suspension system 100, the slide system 110 comprises a substantially vertically disposed rod 112 fixedly mounted to the row unit frame 18 and linear bearings 114 mounted to the front portion of the hopper support 19, thereby enabling the hopper support 19 to move vertically with respect to the rest of the row unit frame 18. In this embodiment, the slide system 110 allows the hopper support 19 to move in a substantially vertical direction with respect to the remainder of the row unit frame 18.

The spring system 120 supports the mass of the hopper support 19, including the mass of the meter 26, the hoppers 22, 24 and the mass of the seed and chemical carried by the hoppers 22, 24. In the preferred embodiment, the spring system 120 includes air-spring 122 (such as Goodyear part number 1S3-011) which is mounted to the row unit frame 18 by a first bracket 124. The upper end of the air spring 122 is secured to the hopper support 19 by a second bracket 126. Because the only other connection of the hopper support 19 to the row unit frame 18 is the slide system 110 which does not support any vertical load, the force exerted upon the hopper support 19 by the air spring 122 is approximately equal to the mass of the hopper support 19 plus the mass of the meter 26, the hoppers 22, 24 and the mass of the seed and chemical within the hoppers 22, 24.

The air-spring 122 is preferably connected to an air reservoir 128 in such a manner to provide the proper system dynamics. The connection between the spring and reservoir preferably includes an appropriately sized restriction such that the volume of air in the spring 122 and reservoir 128 behave as one contiguous volume. However, it has been found to be preferable for the connection between the spring and reservoir to contain an orifice (not shown) which will provide some dynamic damping to the system. The preferred orifice includes a plug installed inside one of the air fittings with a small hole drilled through to provide the proper restriction. A valve system 130 preferably regulates the amount of air in the spring system 120 to maintain the hopper support 19 in the proper equilibrium position. The valve system 130 preferably includes a cam follower lever 132 that contacts a cam 134 which is affixed to the portion of the slide system 110 that is fixed to the row unit frame 18. A valve 136 is preferably connected via an air hose 138 to a high pressure air supply source 140 supported on the planter frame 12. A port on the valve 136 preferably vents to atmosphere for releasing excess air pressure in the spring system 120 as the load supported by the hopper support 19 decreases as the mass of seed and chemical decreases during planter operation.

It should be appreciated that as the mass supported by the hopper support 19 changes with addition of seed and chemical as the planter operates. As a result, the required air pressure within the air system must change in order that the force exerted by the spring 122 remains equal to the mass supported by the hopper support 19. When mass increases, the hopper support 19 will slide downward on the slide system 110 thereby causing the cam follower lever 132 to shift the valve 136 to a position to add air to the air reservoir 128. Increasing the air pressure will cause the spring force to increase until the hopper support 19 is forced to move back to the proper equilibrium position, preferably in the center of the rod 112 of the slide system 110.

As seed and chemical are consumed as the planter operates, the hopper support 19 will, over time, move higher along the rod 112. The cam follower lever 132 will then be caused to shift the valve 136 to a position to slowly vent a small amount of air from the valve system 130, causing the hopper support 19 to return to equilibrium position near the center of the rod 112. The obvious advantage of this air system is that it will allow the hopper support 19 to ride at the same height relative to the row unit frame 18 regardless of the mass of the seed and insecticide in the hoppers 22, 24.

The spring system 120 has an associated air-volume ("spring volume") for any given length of the spring. As previously described, the reservoir 128 and associated air fittings and tubing likewise have an air volume ("reservoir volume") that is fixed regardless of the pressure in the spring system 120. For the following description, the effect of damping in the system is ignored in order to illustrate a more simple concept of the system operation. Any displacement of the hopper support 19 relative to the row unit frame 18 thus results in a change in the spring volume. The force of the spring is a function of the cross-sectional area multiplied by the pressure in the system. The total system volume is the sum of the spring volume and reservoir volume.

The system pressure can be calculated for any given spring volume by the equation $PV=nRT$, where P is the system pressure, V is the system volume (comprising the spring volume plus the reservoir volume), n is the number of moles of gas, R is the gas constant, and T is the temperature of the system. With a change in spring volume, the system volume will change while the reservoir volume remains constant, n is constant, R is constant, and T is constant. Accordingly, a simple linear relationship exists between the system volume and system pressure and thereby spring force. This relationship in the spring rate of the spring 122 can be controlled by the size ratio of the reservoir volume and spring volume. It has been found that an optimum spring rate is approximately five to fifteen percent (5%-15%) of force per inch of travel. The average system pressure (excluding momentary dynamic changes of less than a second duration) is controlled by the valve system 130 and must be maintained at a level that will provide a spring force equal to the mass of the hopper support 19 and the mass supported by the hopper support 19. This mass may range from 80 pounds to 225 pounds as the amount of seed and chemical in the hoppers change. Different mass supported by the hopper support 19 will provide a different spring rate of the air spring 122.

The variation in spring rate with mass does not present a problem because the spring rate increases linearly with the mass supported by the hopper support 19. Thus, any vertical accelerations, and henceforth velocity, of the meter are a function of the spring rate divided by the mass supported by the hopper support 19. Therefore, regardless of mass, the seed meter 26 will be substantially isolated from abrupt changes in vertical displacement and vertical accelerations which have a detrimental effect on seed spacing.

For example, as the planter traverses the field and the gauge wheels 44 encounter an obstacle or other change in the soil topography, the gauge wheels 44 and the lower portion of the row unit frame 18 will begin to move upwardly. Assuming the row unit frame 18 rises one inch, the spring 122 will likewise compress approximately one inch and the force in the spring 122 will increase slightly. If the mass of the hopper support 19 and the mass of the material it is supporting is assumed to equal 100 pounds of mass, and assuming the spring rate of the spring 122 is ten pounds per inch of displacement (which is an average of the preferred spring rate range of five to fifteen percent per inch of displacement), in the above example of one inch of upward displacement of the row unit frame 18, the result would be an increase in force of ten pounds on the spring system 120. This ten pound increase is relatively insignificant when compared to the total weight of approximately 100 pounds. Therefore the resulting acceleration of the hopper support 19 and thus the meter 26, directly or operably supported thereby, is approximately one-tenth ($1/10$) of gravitational acceleration. Thus, the hopper support 19 will very slowly begin to move upward until it has traveled the one inch and the force in the spring 122 has fallen back to the equilibrium condition. As the row unit 14 encounters dips in the ground, the corresponding phenomenon will also occur in the opposite direction, allowing the hopper support 19 to slowly descend.

The foregoing discussion did not address damping, which is preferably present in the spring system 120. For slower dynamic inputs to the suspension system, the above illustration is accurate and the system will function without the presence of damping. Damping is defined as a force which is proportional to the velocity of the system. By including an orifice (not shown) between the spring 122 and reservoir 128, the rate of air flow between the spring and reservoir is reduced. This provides a temporary increase in pressure in the spring which temporarily increases the force that the spring is providing against the hopper support 19. This force increases the acceleration of the hopper support 19 from a value in the above illustration of one-tenth of gravitational acceleration to approximately three-tenths to six-tenths of gravitational acceleration. It has been found that the extra acceleration is needed to prevent the hopper support 19 from suddenly reaching the end of its travel on the slide system 110. The foregoing describe damping is accomplishing primarily as in any other dynamic system in that it retards high amplitude motion that would tend to oscillate for several cycles before coming to a stop.

With the suspension system 100, the hopper support 19 will likely be disposed vertically higher above the remainder of the row unit frame 18 than with a planter that does not utilize the suspension system 100. Accordingly, the seed meter 26 will be disposed a greater vertical distance above the seed tube 28. In order to ensure that the seeds are properly guided into the seed tube 28, an additional upper seed tube 150 is preferably provided as illustrated, for example, in FIG. 4. In this embodiment, the upper seed tube 150 includes an ear 152 for removable attachment to the hopper support 19. The lower portion of the upper seed tube 150 engages the upper portion of the conventionally disposed seed tube 28. The width of the upper tube 150 is preferably less than the internal width of the upper portion of the conventional seed tube 28 so that the upper tube 150 can slide up and down within the conventional seed tube 28. The front wall 154 of the upper tube 150 preferably remains in contact with the front wall 29 of the conventional seed tube 28 so that seeds do not experience a sudden change in trajectory as they fall between the tubes 150, 28.

Figure 3:
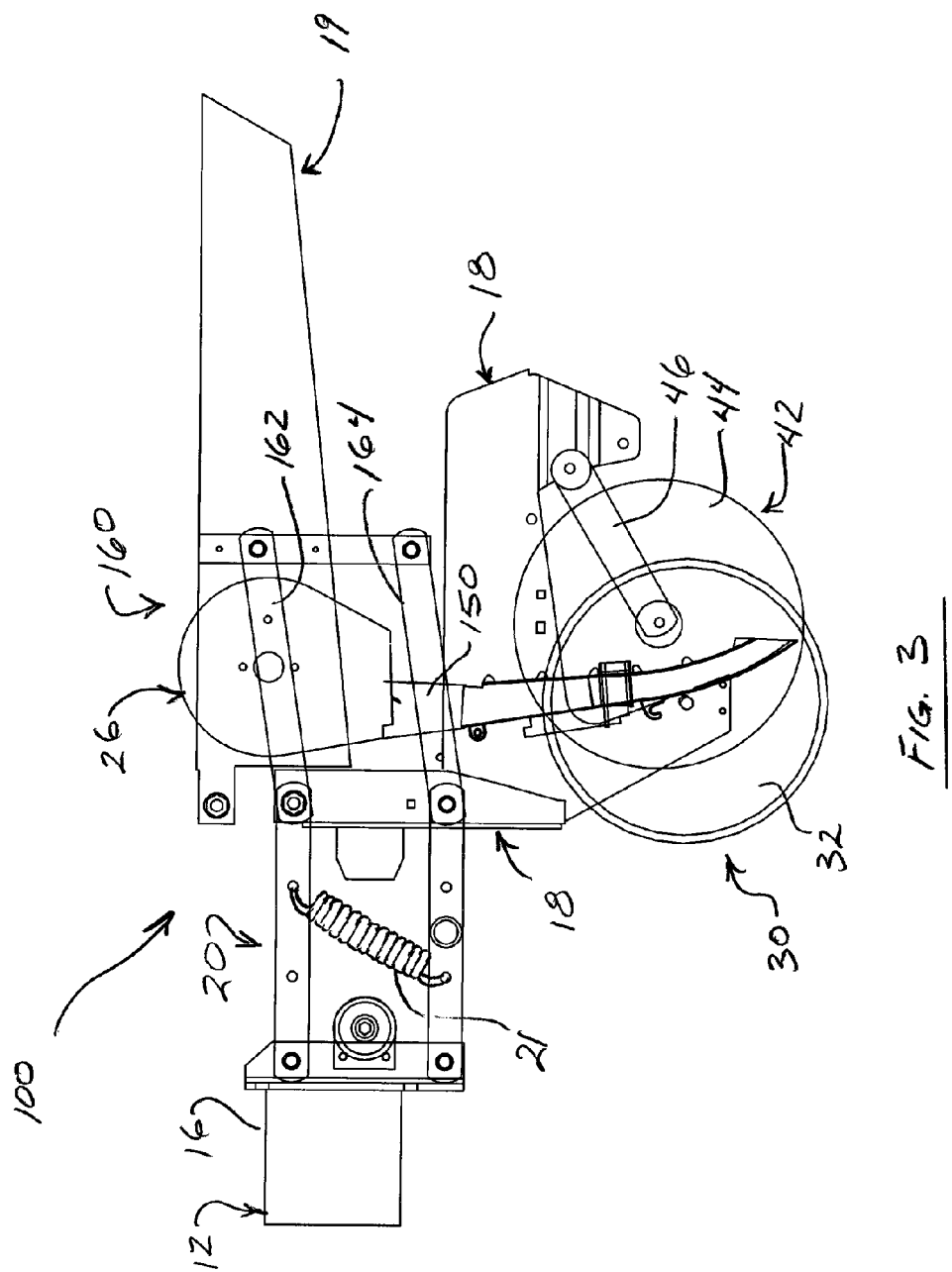
FIG. 3 is a side elevation view of a planter incorporating an alternative embodiment of the suspension system of the present invention.
Figure 4:
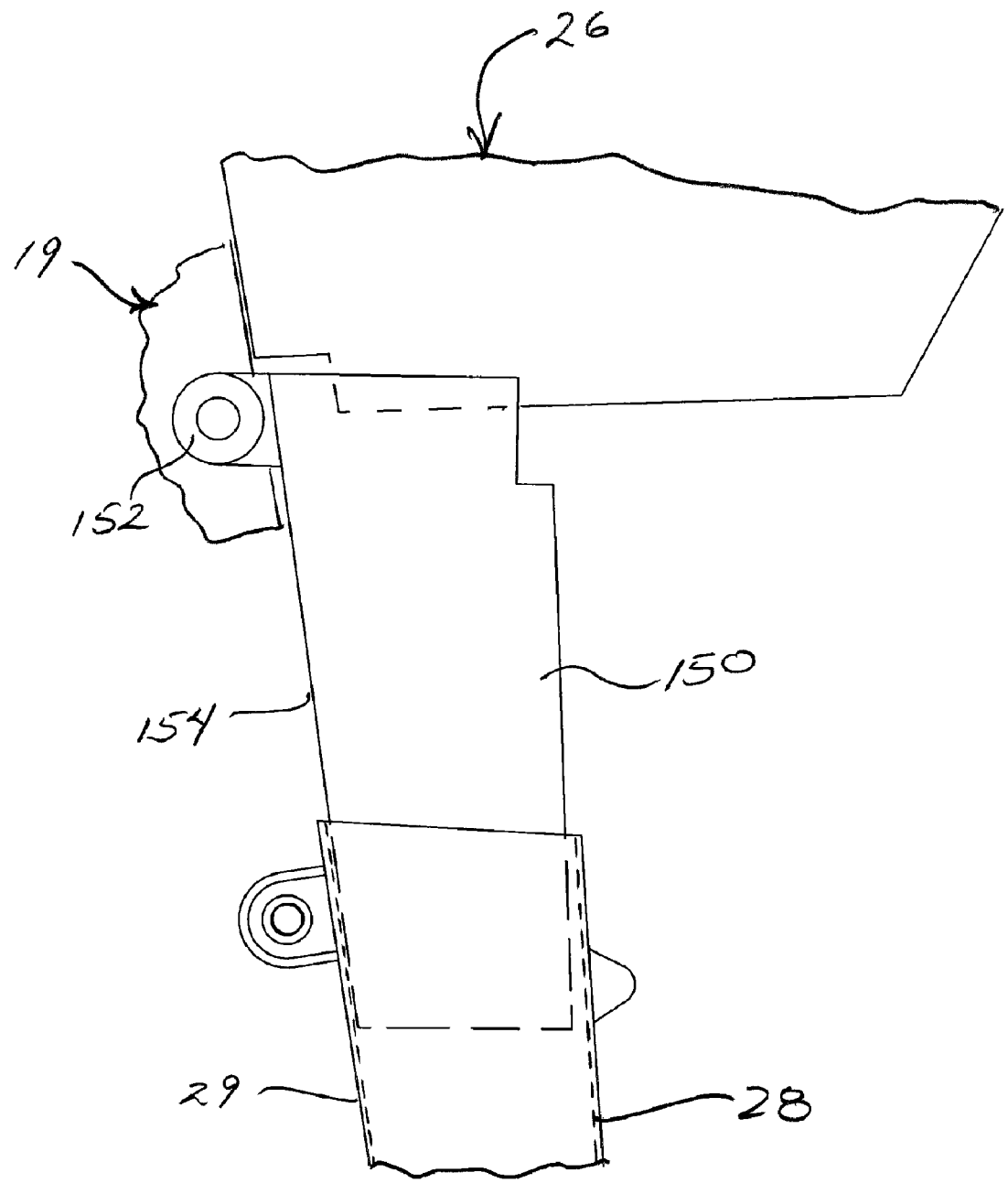
FIG. 4 is a detailed view of the seed tube of FIG. 2.

An alternative embodiment of the suspension system 100 of the present invention is shown in FIG. 3. In this embodiment, the hopper support 19 is mounted to a parallel arm linkage 160. The parallel arms 162, 164 of the parallel arm linkage 160 are pivotally secured to the row unit frame 18 at their forward end and operably at their rearward ends to the hopper support 19. While not shown on FIG. 3, the same spring system 120, and upper seed tube 150 would be mounted in like manner as illustrated in FIGS. 2 and 4 respectively.

The result of the suspension system 100 of the present invention is a meter which rides very smoothly through the field. The meter is isolated from harmful accelerations which can jar seeds loose from the seed selection mechanism of the seed meter and it provides substantially uniform initial vertical velocity between seeds discharged from the seed meter thereby resulting in improved in-furrow seed spacing.

The foregoing description is presented to enable one of ordinary skill in the art to make and use the invention and is provided in the context of a patent application and its requirements. Various modification to the preferred embodiment of the system and method of use and the generic principles and features described herein will be readily apparent to those of skill in the art. Thus, the present invention is not to be limited to the embodiments of the system and methods described above and illustrated in the drawing figures, but is to be accorded the widest scope consistent with the spirit and scope of the appended claims.

What is claimed is:

1. A system to reduce vertical acceleration experienced by seed meters of an agricultural planter during planting operations, said system comprising:
    in an agricultural planter having a plurality of spaced row units, each row unit mounted to a transverse toolbar of the planter main frame independently vertically movable relative to said transverse toolbar, each row unit having a lower bracket operably supporting a furrow opening assembly and a rearwardly extending upper support member disposed above said lower bracket and operably supporting a seed meter;
    a suspension system for each of said row units, said suspension system disposed to operably vertically support said upper support member vertically movable independently of said lower bracket of each of said row units;
    whereby each of said spaced row units is vertically independently movable relative to said transverse toolbar and each of said upper support members is vertically independently movable relative to said lower brackets of each of said spaced row units.

2. The system of claim 1 wherein said suspension system includes a slide system and a spring system.

3. The system of claim 2 wherein said slide system comprises a substantially vertically disposed rod supported by said lower bracket of said row unit frame;
    at least one linear bearing slidably disposed on said vertically disposed rod, said at least one linear bearing operably mounted to a forward end of said upper support member.

4. The system of claim 2 wherein said spring system includes:
    an air spring operably mounted to said lower bracket and to said upper support member;
    an air reservoir in fluid communication with said air spring and a pressurized air source;
    a valve to regulate air in said spring system;
    a cam supported by said slide system mounted to said row unit frame;
    a cam follower lever that contacts said cam, said cam follower lever supported by said upper support member;
    a port on said valve for venting air in said spring system to atmosphere.

5. The system of claim 4 further including a dampener, said dampener comprising an orifice disposed in the spring system between said air spring and said reservoir to reduce air flow between said spring and said reservoir.

6. The system of claim 2 wherein said spring system includes:
    an air spring disposed between said row unit frame and said upper support member;
    an air source in fluid communication with said air spring; and
    a valve system to regulate air in said air spring.

7. The system of claim 6 further including a dampener, said dampener comprising an orifice disposed between said air spring and said air source to reduce air flow between said spring and said air source.

8. The system of claim 1 wherein said suspension system includes a parallel linkage.

9. The system of claim 8 wherein said suspension system further includes a spring system, said spring system comprising:
    an air spring disposed between said lower bracket and said upper support member;
    an air source in fluid communication with said air spring; and
    a valve system to regulate air in said air spring.

10. The system of claim 9 further including a dampener, said dampener comprising an orifice disposed between said air spring and said air source to reduce air flow between said spring and said air source.

11. A planter, comprising:
    a mobile main frame having a transverse toolbar;
    a plurality of row units operably supported at spaced intervals along said transverse toolbar, each row unit having a row unit frame comprising an upper support member operably supporting a seed meter and a lower bracket operably supporting a furrow opening assembly, said lower bracket disposed below said upper support member; and
    a suspension system disposed to isolate said upper support member from said lower bracket to reduce vertical motion experienced by said row unit frame during planting operations as the planter traverses a ground surface.

12. The planter of claim 11 wherein said suspension system includes:
    a substantially vertically disposed rod operably supported by said lower bracket; and
    at least one linear bearing slidably disposed on said substantially vertically disposed rod, said at least one linear bearing operably mounted to a forward end of said upper support member.

13. The planter of claim 12 wherein said suspension system further includes:
    an air spring disposed between said lower bracket and said upper support member;
    an air source in fluid communication with said air spring; and
    a valve system to regulate air in said air spring.

14. The planter of claim 13 further including a dampener, said dampener comprising an orifice disposed between said air spring and said air source to reduce air flow between said spring and said air source.

15. The planter of claim 11 wherein said suspension system includes a parallel linkage.

16. The planter of claim 15 wherein said suspension system further includes a spring system, said spring system comprising:

an air spring disposed between said lower bracket and said upper support member;

an air source in fluid communication with said air spring; and a valve system to regulate air in said air spring.

17. The planter of claim 16 further including a dampener, said dampener comprising an orifice disposed between said air spring and said air source to reduce air flow between said spring and said air source.

* * * * *